US 6,550,841 B1

(12) United States Patent
Burdon et al.

(10) Patent No.: US 6,550,841 B1
(45) Date of Patent: Apr. 22, 2003

(54) TAILGATE NESTED TAILGATE BED EXTENDER (75) Inventors: Peter M. Burdon, Newmarket (CA); Alan Lytle, Mississauga (CA); Peter Oliver, Thornhill (CA); Ruth Lytle, Toronto (CA)

(73) Assignee: Canada Inc., Newmarket (CA)

( * ) Notice: Subject to any disclaimer, the term of this patent is extended or adjusted under 35 U.S.C. 154(b) by 0 days.

(21) Appl. No.: 10/035,687

(22) Filed: Dec. 26, 2001

(51) Int. Cl.⁷ .................................................. B60P 1/00
(52) U.S. Cl. ..................................... 296/57.1; 296/26.11
(58) Field of Search ........................... 296/57.1, 26.08, 296/26.09, 26.1, 26.11

(56) References Cited

U.S. PATENT DOCUMENTS

| | | | | |
|---|---|---|---|---|
| 5,775,759 A | | 7/1998 | Cummins ..................... 296/26 |
| 5,788,311 A | * | 8/1998 | Tibbals ......................... 296/62 |
| 6,045,172 A | * | 4/2000 | Thomas et al. ............. 296/26.1 |
| 6,142,548 A | * | 11/2000 | Kuhn et al. ................. 296/26.1 |
| 6,340,190 B1 | * | 1/2002 | Rosebrugh et al. ...... 296/26.11 |
| 6,364,392 B1 | * | 4/2002 | Meinke et al. ................. 296/62 |

* cited by examiner

Primary Examiner—Joseph D. Pape
(74) Attorney, Agent, or Firm—Ratner Prestia (57) ABSTRACT A tailgate bed extender for a vehicle truck bed. The tailgate bed extender has a tray mounted on a vehicle tailgate and a rear frame pivotally coupled to the tray. Sidearms are pivotally coupled to opposing side edges of the rear frame and are attachable to the vehicle truck bed. A hinge assembly that has a rotation axis, which is movable relative to the tray, joins the rear frame to the tray. The tailgate bed extender is rotatable from a stored position in which the rear frame abuts the tray to a loading position in which the rear frame is at an angle of approximately 270 degrees to the tray.

16 Claims, 6 Drawing Sheets

TAILGATE NESTED TAILGATE BED EXTENDER

FIELD OF THE INVENTION

The present invention relates to vehicle tailgate bed extenders, and more particularly, a tailgate bed extender that is nested on the tailgate.

BACKGROUND OF THE INVENTION

Devices for extending the length of vehicle truck beds have become popular in recent years due in part to the emergence of extended cab vehicles. The extended cab has increased the passenger carrying capacity of the vehicle, however, it has reduced the available truck bed space. In order to recover at least a portion of the truck bed space lost, many truck bed extenders, such as the vehicle bed extender described in U.S. Pat. No. 5,775,759 issued to Cummins, have been developed.

Typically, tailgate bed extenders are retrofitted onto the tailgates of existing vehicles. Tailgate bed extenders must be relatively lightweight so that they do not interfere with the regular operation of the vehicle. In addition, tailgate bed extenders should be easy to deploy and store. Heavy tailgate bed extenders are cumbersome to use and reduce the structural integrity of the existing tailgate. Some tailgate bed extenders are partially mounted in the truck bed in order to help distribute the weight of the tailgate bed extender, so that the tailgate is not overloaded. This configuration is undesirable because the tailgate bed extender blocks off a portion of useable truck bed space.

Existing tailgate bed extenders are typically mounted so that the hinge covers at least part of the upper edge of the vehicle tailgate. Therefore, it is possible to view the tailgate bed extender from outside of the vehicle when it is in the stored position. This configuration is aesthetically undesirable, particularly on a new vehicle. The existing tailgate bed extenders are intended for use with vehicles having open truck beds, such as pick up trucks, however, they can not be used for sport utility vehicles or pick up trucks having caps.

In addition to being difficult to deploy and store, existing tailgate bed extenders are often too complex for an average vehicle owner to install. Professional installation can be costly depending on the complexity of the tailgate bed extender design. A tailgate bed extender that is simple to install by a vehicle owner or by a professional at a reasonable cost is desirable.

It is therefore an object of an aspect of the present invention to provide a tailgate bed extender that obviates or mitigates some or all of the above disadvantages.

SUMMARY OF THE INVENTION

According to one aspect of the present invention there is provided a tailgate bed extender for a vehicle truck bed, the tailgate bed extender comprising:
  a tray coupled to an inner wall of a tailgate of the vehicle truck bed, the tray being inset from a free edge of the tailgate;
  a rear frame pivotally coupled to the tray;
  sidearms pivotally coupled to opposing side edges of the rear frame, the sidearms being attachable to the vehicle truck bed;
  a hinge assembly joining the rear frame to the tray, the hinge assembly having a rotation axis, the rotation axis being movable relative to the tray; and
  wherein the rear frame is rotatable from a stored position in which the rear frame abuts the tray to a loading position in which the rear frame is at an angle of at least 180 degrees relative to the tray.

According to another aspect of the present invention there is provided a tailgate bed extender for a vehicle truck bed, the tailgate bed extender comprising:
  a rear frame pivotally coupled to an inner wall of the tailgate;
  sidearms pivotally coupled to opposing side edges of the rear frame, the sidearms being attachable to the vehicle truck bed;
  a hinge assembly joining the rear frame to the inner wall of the tailgate, the hinge assembly having a rotation axis, the rotation axis being movable relative to the inner wall of the tailgate; and
  wherein the rear frame is rotatable from a stored position in which the rear frame abuts the inner wall to a loading position in which the rear frame is at an angle of at least 180 degrees relative to the inner wall.

According to another aspect of the present invention there is provided a tailgate bed extender for a vehicle tail bed, the tailgate bed extender comprising:
  a rear frame pivotally coupled to an inner wall of the tailgate;
  sidearms pivotally coupled to opposing side edges of the rear frame, the sidearms being attachable to the vehicle tail bed;
  a hinge assembly joining the rear frame to the inner wall of the tailgate, the hinge assembly having a rotation axis, the rotation axis being movable relative to the inner wall of the tailgate; and
  wherein the rear frame is rotatable from a stored position in which the rear frame abuts the inner wall to a loading position in which the rear frame is at an angle of at least 180 degrees relative to the inner wall.

It is an advantage of an aspect of the present invention that the tailgate bed extender is fully contained on the vehicle tailgate and does not interfere with the upper and side edges of the tailgate.

BRIEF DESCRIPTION OF THE DRAWINGS

Embodiments of the present invention will now be described more fully with reference to the accompanying drawings in which.

DETAILED DESCRIPTION OF THE PREFERRED EMBODIMENT

Figure 1:
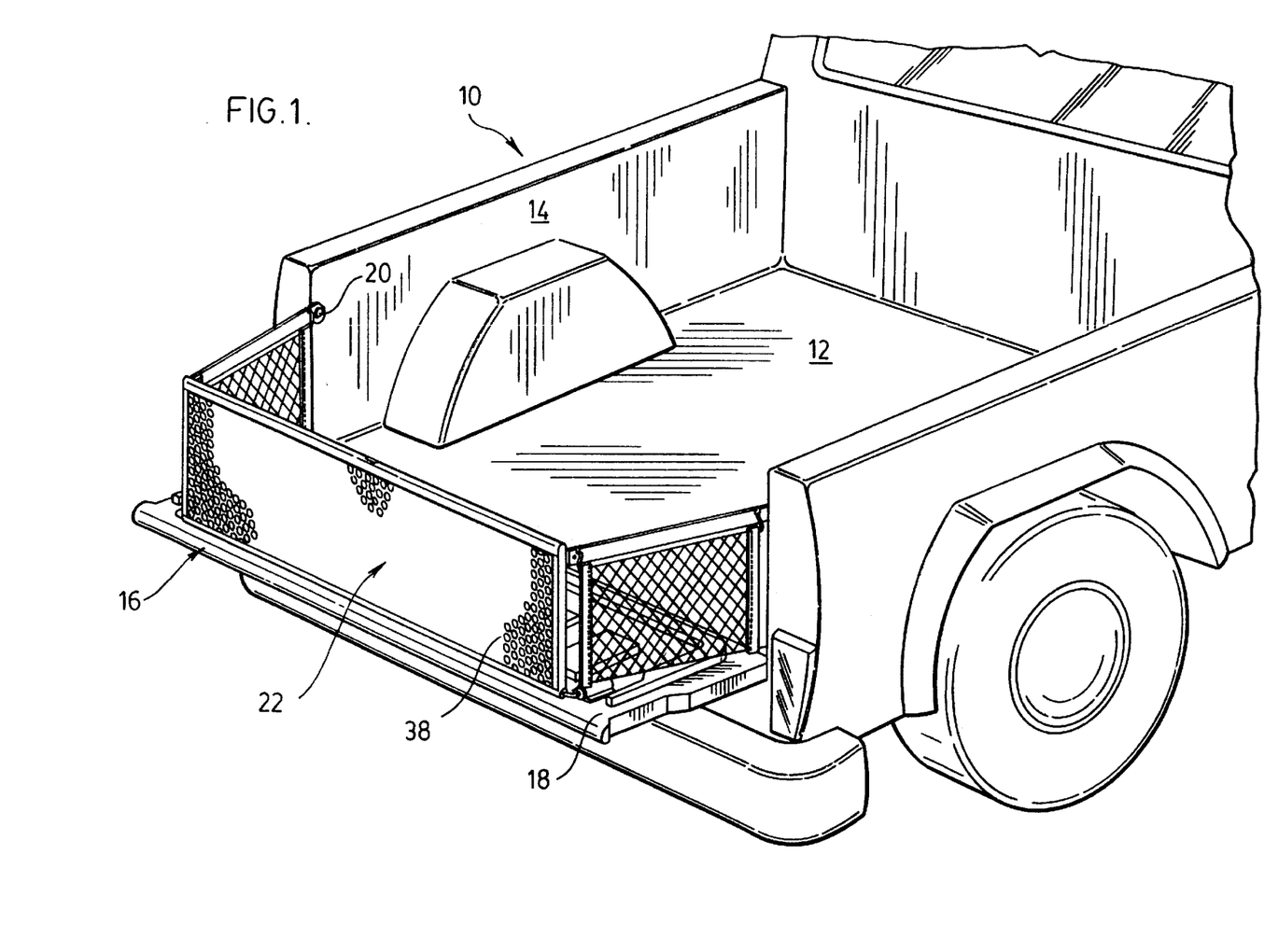
FIG. 1 is a perspective view of a vehicle with a tailgate bed extender of the present invention in a deployed position.
Figure 10:
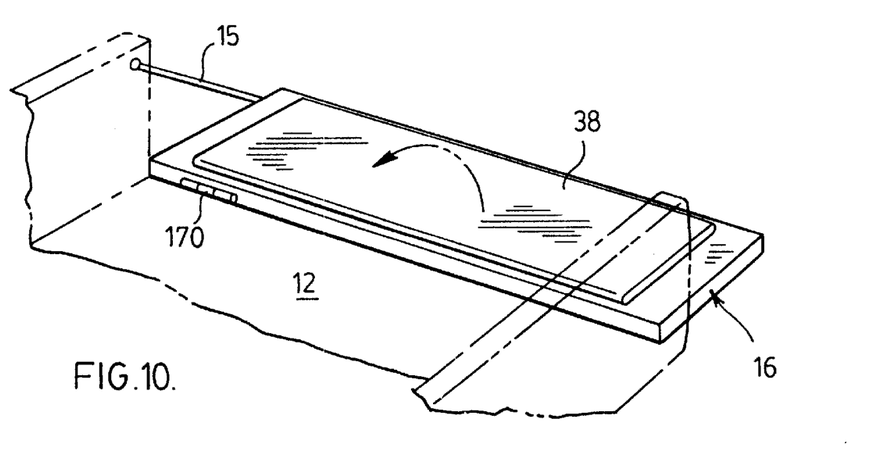
FIG. 10 is a perspective view of the tailgate bed extender of FIG. 6 in a stored position.

Referring to FIG. 1, a rear portion of a vehicle 10 is generally shown. The vehicle 10 includes a truck bed 12 having inner sidewalls 14 and a tailgate 16. Striker posts 20, for securing the tailgate 16 in a closed position, extend from the inner sidewalls 14 of the truck bed 12. The usual flexible pair of tailgate cables 15 (one cable is shown in FIG. 10) hold the tailgate 16 in the horizontal position. The cable 15 is attached to the tailgate 16 and the striker post 20 and extends therebetween. A tailgate bed extender, generally indicated at 22, is installed on an inner wall 18 of the vehicle tailgate 16. The tailgate bed extender 22 is shown in a deployed position.

Figure 2:
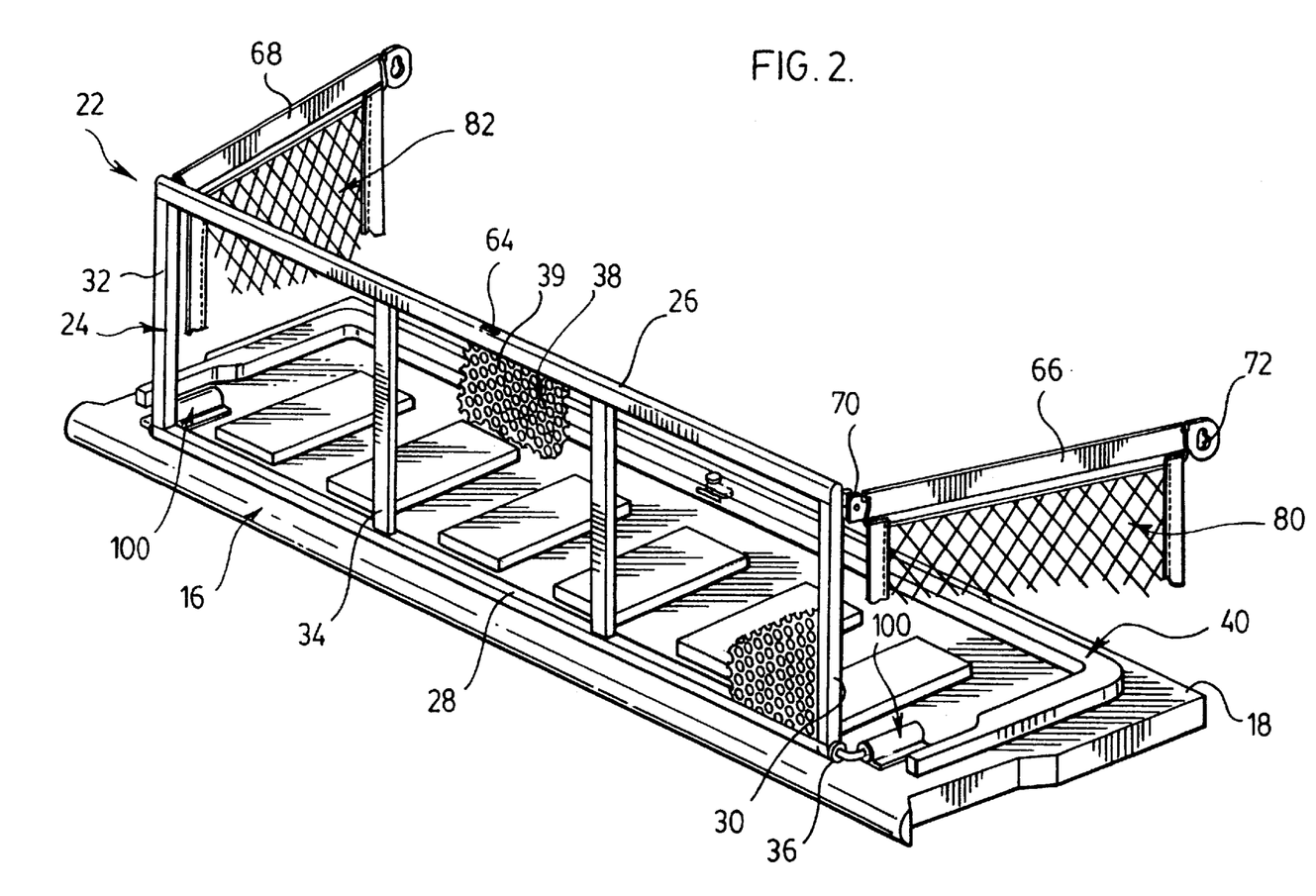
FIG. 2 is perspective view of the tailgate bed extender of FIG. 1.

The tailgate bed extender 22 is shown in greater detail in FIG. 2. The tailgate bed extender 22 generally comprises a rear frame 24 that is pivotally connected to a tray 40, which is coupled to the tailgate 16. The rear frame 24 is generally rectangular shaped and includes an upper edge member 26, a lower edge member 28 and side edge members 30 and 32. The rear frame 24 additionally includes two cross members 34, which are spaced along the rear frame 24 between the side edge members 30, 32. The cross members 34 provide the rear frame 24 with additional support.

The rear frame 24 is constructed of a lightweight material. In a preferred embodiment, upper and lower edge members 26 and 28 are formed from aluminum extrusions, which have a bore extending therethrough. The extrusions additionally include a channel portion, which does not open all the way to the bore, for receiving the ends of side edge members 30, 32 and cross members 34. The side edge members 30, 32 and cross members 34 are formed from aluminum C channel extrusions. The upper, lower, side and cross members 26, 28, 30, 32 and 34 are welded together to provide a rear frame 24 which has optimum strength and weight characteristics. It is also possible to use aluminum extrusions having different cross sections.

The rear frame 24 additionally includes apertures 36 that are located at the opposite lower corners of the rear frame 24. In the preferred embodiment, the apertures 36 are part of the bore of the lower edge member 28 extrusion. The apertures 36 are used to couple the rear frame 24 to the tray 40.

In an alternative embodiment, the rear frame members 26, 28, 30, 32 and 34 may be integrated to form a single rear frame member.

In a further alternative embodiment, the rear frame 24 may comprise side edge members 30, 32 and upper edge member 26 to form a single U-shaped rear frame member. In this case, the apertures 36 may be formed at the lower ends of the side members 30, 32.

In yet a further alternative embodiment, the rear frame 24 is comprised of a plastic having suitable strength and rigidity characteristics.

A rear panel 38, as shown in FIG. 2, is coupled to an outer side of the rear frame 24. The rear panel 38 is attached so that it covers the cross members 34 of the rear frame 24 and can be seen from the rear of the vehicle 10. The rear panel 38 provides a surface on which a logo or a reflective safety graphic can be mounted. The reflective safety graphic warns drivers travelling behind the vehicle 10 that the tailgate 16 is down and extends past the taillights of the vehicle 10.

In a preferred embodiment, the panel 38 of FIG. 1 is constructed of aluminum having a thin gauge and is welded to the rear frame 24. The rear panel 38 is perforated at 39 to decrease the overall weight of the panel 38 and to facilitate airflow through the panel 38. The perforations 39 formed in the rear panel 38 reduce the drag caused by the tailgate bed extender 22 thus increasing the fuel efficiency of vehicle 10.

In an alternate embodiment, the rear panel 38 is constructed of a plastic material and is coupled to the rear frame by suitable fasteners.

Figure 3:
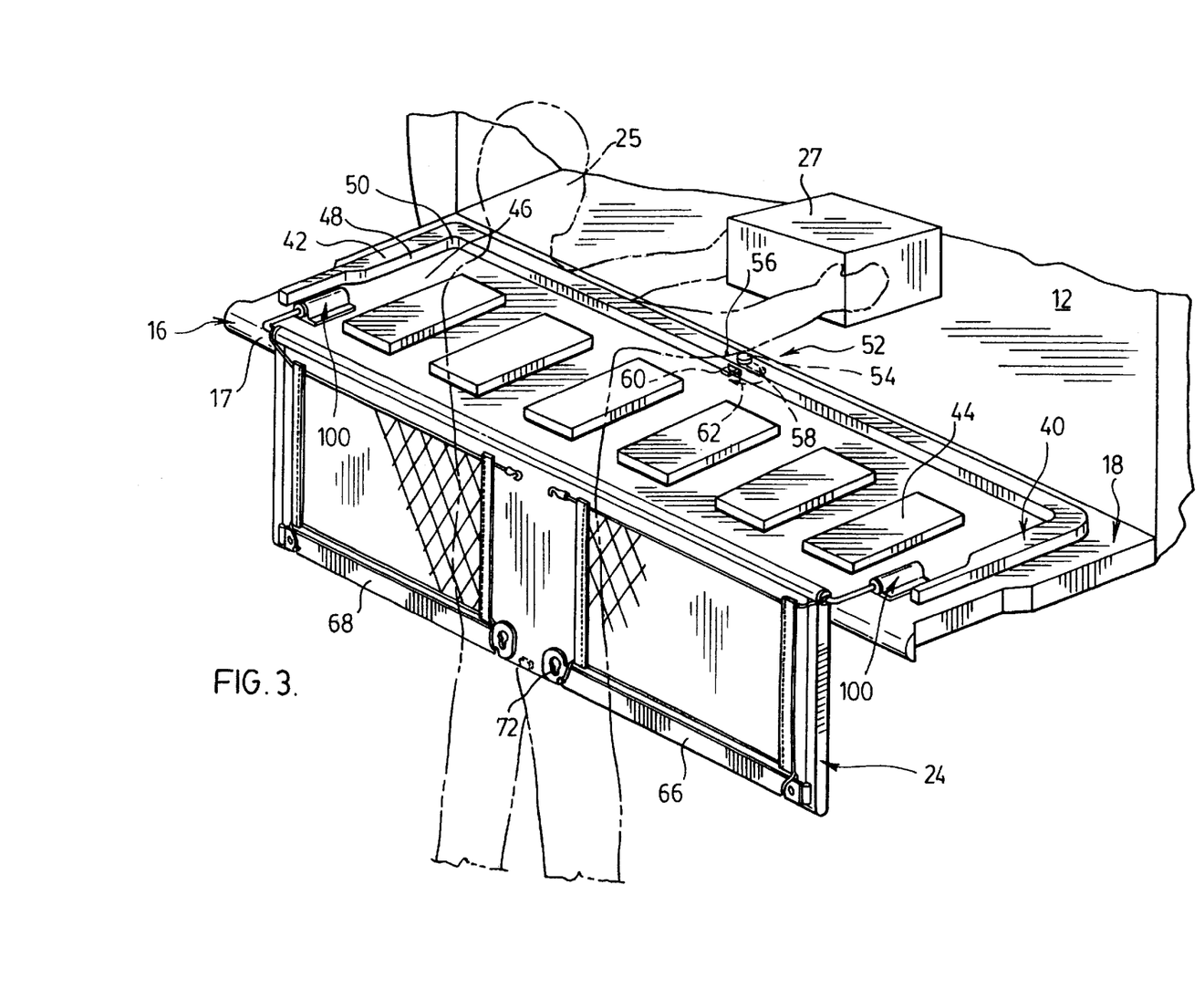
FIG. 3 is a perspective view of the tailgate bed extender of FIG. 2 in a loading position.

Referring to FIG. 3, the tailgate bed extender 22 is shown in a loading position. Due to the unique configuration of tailgate extender hinge assemblies, the rear frame 24 and rear panel 38 of the tailgate bed extender 22 are capable of being rotated approximately 270 degrees from a stored position of FIG. 10. As shown in FIG. 3, the tailgate bed extender 22 does not limit access to the truck bed 12. The rear frame 24 of the tailgate bed extender 22 is rotated out of the way so that a user 25 can lean over and easily load individual items such as small boxes 27, bags, packages or any other items onto the truck bed 12.

In a retrofit application or even an OEM situation, tray 40 is coupled to the inner wall 18 of the vehicle tailgate 16 by fasteners (not shown). The tray 40 is sized so that it can be generally centered on the inner wall 18 of the tailgate 16. The tray 40 is formed from a single molded piece and has a generally uniform thickness. The tray 40 comprises a U-shaped protrusion 42 and six rectangular protrusions 44 that extend outwardly from a base 46. The U-shaped protrusion 42 comprises a side surface 48 that extends outwardly from the base 46 and a generally flat top surface 50. The side surface 48 is continuous and extends around perimeter of the top surface 50. The tray 40 is arranged so that rear frame 24 can lie against the tray 40 without contacting the U-shaped protrusion 42 or the rectangular protrusions 44. In the stored position, the rear frame 24 lies generally flat against the base 46 so that the tailgate bed extender 22 is nested in the tray 40. The tray 40 is typically constructed of vacuum formed plastic. The tray 40 alternatively may be constructed of any suitable rigid material that is relatively lightweight.

The tailgate bed extender 22 is designed to be mountable onto most sizes of the tailgates of full size, mid size and compact vehicles 10. The tailgate bed extender 22 may be sized for use on small pickup trucks, large pickup trucks, Sport Utility Vehicles or large farm equipment vehicles, for example.

A lock assembly 52 is recessed into the top surface 50 of the U-shaped protrusion 42 mid way along the tray 40. The lock assembly 52 extends upwardly through an aperture 54 that is formed in the top surface 50. The lock assembly 52 is secured to the U-shaped protrusion 42 of the tray 40 through securing apertures 56 and 58, which are located on opposite sides of aperture 54, by fasteners (not shown). An opening 62 is formed in the side surface 48 of the U-shaped protrusion 42. A latch 60 of the lock assembly 52 is movable to extend through the opening 62. When the tailgate bed extender 22 is in the stored position, the latch 60 engages a cooperating latch recess 64, shown in FIG. 2, that is formed in the upper edge member 26 of the rear frame 24. The lock assembly 52 is used to maintain the rear frame 24 in a nested position in the tray 40. The lock assembly 52 is responsive to a key (not shown) that may be stored on a user's key chain or kept in a convenient location in the vehicle 10.

Figure 5:
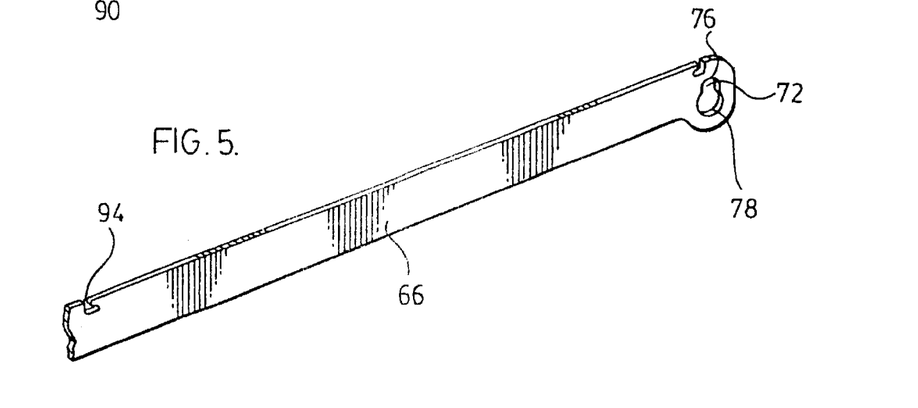
FIG. 5 is a perspective view of a sidearm of the tailgate bed extender of FIG. 2.

Referring back to FIG. 2, sidearms 66 and 68 extend from opposing upper edges of the rear frame 24. The sidearms 66 and 68 are attached to the side edge members 30 and 32 respectively by side arm hinges 70. An aperture 72 is located at the free end of each side arm 66, 68. The aperture 72, shown in FIG. 5, includes a smaller portion 76 that is located above a larger portion 78. Each aperture 72 is sized to receive a striker post 20 of the vehicle 10 through the larger portion 78. Once the striker post 20 has passed through the larger portion 78, the sidearm 66, 68 moves downwardly so that the smaller portion 76 of the aperture 72 engages the striker post 20 thus locking the sidearm 66, 68 to the vehicle 10. It is typically not necessary to use force to pull the sidearms 66, 68 down, they generally move into the securing position without any urging due on their own weight.

The sidearms 66, 68 are movable from the deployed position of FIGS. 1 and 2 into abutment with the rear frame 24 prior to being moved to the parcel loading position of FIG. 3. The sidearms 66, 68 are secured against the rear frame 24 by hook and loop fasteners (not shown).

Figure 4:
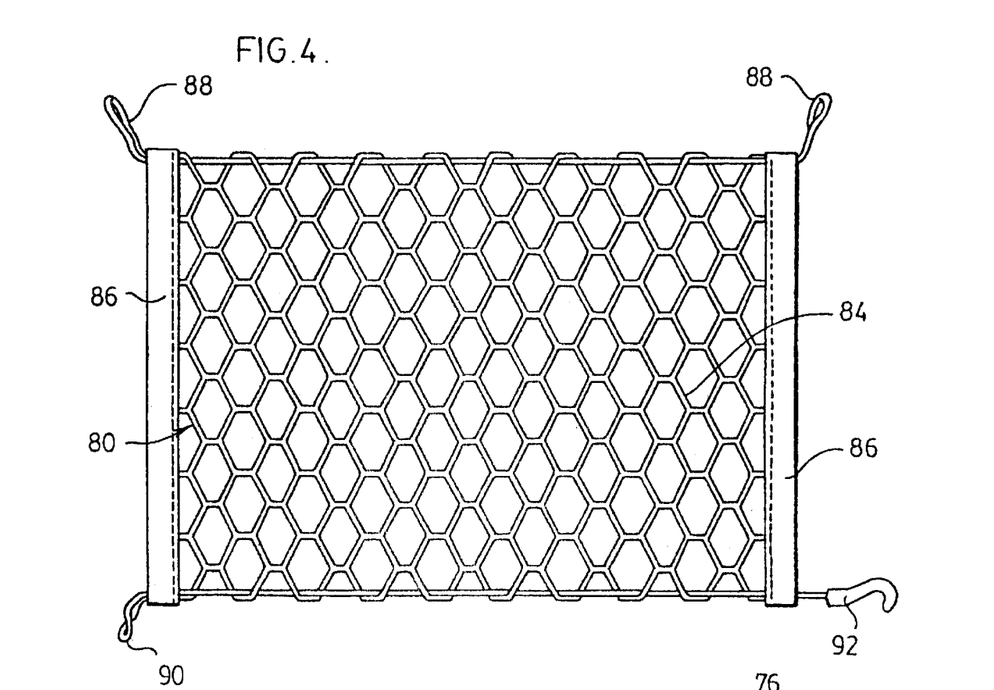
FIG. 4 is a front view of a side panel of the tailgate bed extender of FIG. 2.

Referring again to FIG. 2, the tailgate bed extender 22 further includes two side panels, 80 and 82, which are attached to sidearms 66 and 68 respectively. Each side panel 80, 82, shown in FIG. 4, is comprised of a piece of netting 84 with two side surges 86 that are folded around and sewn to the upwardly extending edges of the netting 84. The side panels 80, 82 are coupled to the sidearms 66, 68 by loops 88, which are located at the upper corners of each side panel 80, 82. The loops 88 engage notches 94 of FIG. 5 that are formed in the upper edge of the sidearms 66, 68. A third loop 90 couples a first lower edge of each side panel 80, 82 to the adjacent side edge member 30, 32 of the rear frame 24. A hook 92 couples a second lower edge of each side panel 80, 82 to the tailgate 16. The hook 92 engages existing structure of the tailgate 16 adjacent the truck bed 12. The user 25 can locate the hooks 92 in a suitable location so that the loops 88, 90 and hooks 92 maintain the side panels 80, 82 taut so that items placed in the truck bed 12 are contained. In addition, the taut side panels 80, 82 apply a downward force on the sidearms 66, 68, which helps to maintain the sidearms 66, 68 locked to the striker posts 20 of the vehicle. The netting 84 is typically formed from nylon cord but may be formed from any suitable material. It will be appreciated by a person skilled in the art that the side panels 80, 82 could alternatively be comprised of a rigid material.

Figure 6:
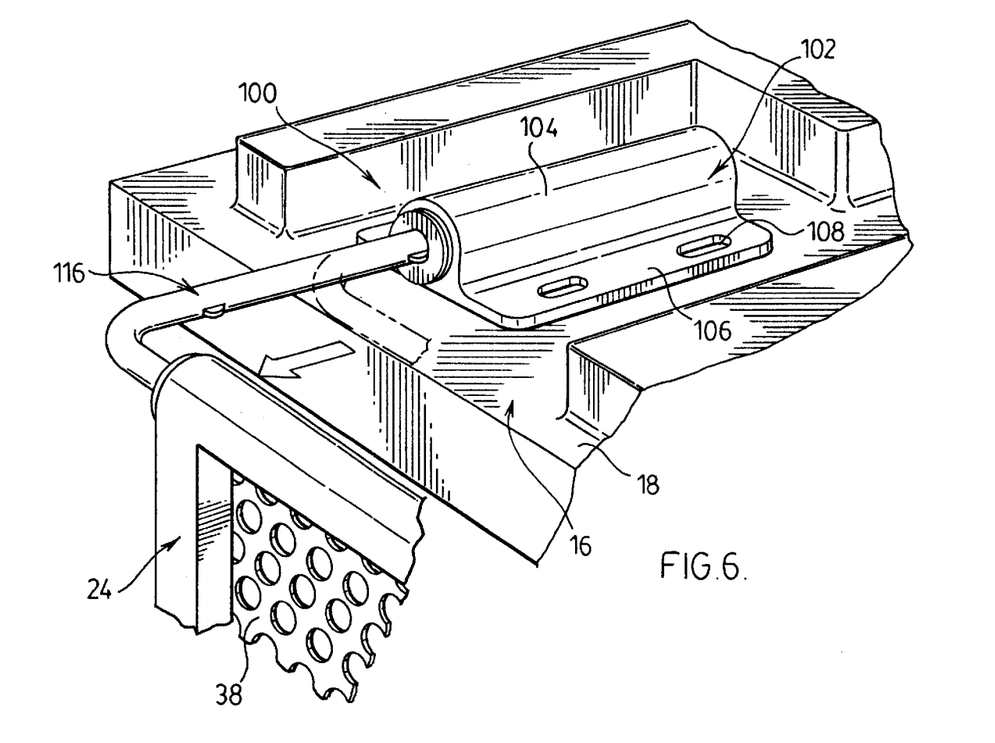
FIG. 6 is a perspective view of a hinge assembly and a portion of a rear panel of the tailgate bed extender of the present invention.
Figure 7:
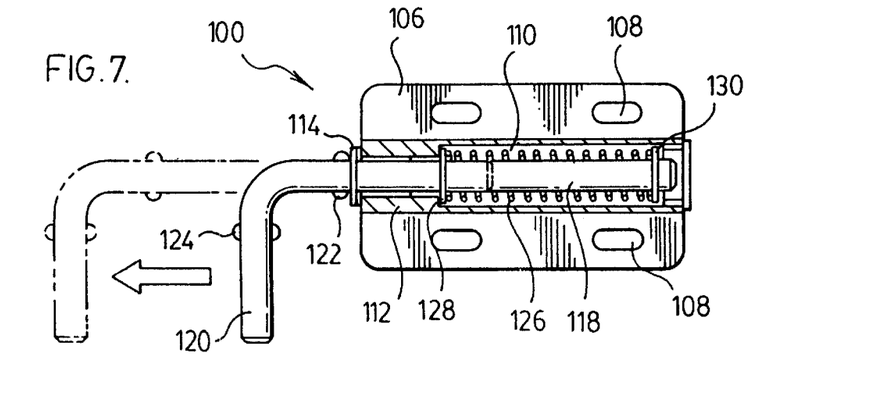
FIG. 7 is a plan view of the hinge assembly of FIG. 4.

As shown in FIGS. 1, 2 and 3, the tailgate bed extender 22 comprises unique two hinge assemblies 100, which are located adjacent opposite side ends of the rear frame 24 and permit "out of the way" storage of the tailgate and pivoting of the tailgate 270°. Referring now to FIGS. 6 and 7, the hinge assembly 100 is shown in greater detail. The hinge assembly 100 is secured on the tray 40 which is coupled to the inner wall 18 of the tailgate 16 therethrough.

The hinge assembly 100 generally comprises a housing 102 and a hinge pin 116 which is slideable into a bore 110 of the housing 102. The housing 102 includes a cylindrical portion 104, through which the bore 110 at least partially extends. Bore 110 has a step 112 formed therein adjacent an inlet 114 of the bore 110. Flanges 106 extend along the length of cylindrical portion 104 on either side thereof. Each flange 106 includes two slots 108 formed therein for attachment of fasteners (not shown) through the tray 40 of the tailgate bed extender 22 to the inner wall 18 of the tailgate 16.

The hinge pin 116 preferably includes a longer portion 118 and a bent shorter portion 120. The bent portion 120 extends at an angle, typically approximately 90 degrees, to the long portion 118 and is inserted into the corresponding aperture 36 of the rear frame 24. A rotation axis is aligned with the bent portion 120 of the hinge pin 116 and the rear frame 24 is rotatable thereabout.

A first pair of outwardly extending tabs 122 is provided on the long portion 118 of the hinge pin 116 and a second pair of outwardly extending tabs 124 is provided on the bent portion 120 of the hinge pin 116. The tabs 122, 124 serve to limit the movement of the hinge pin 116 into the bore 110 and the apertures 36 of the rear frame 24 respectively.

A spring 126 is located inside the bore 110 of the housing 102 and surrounds the long portion 118 of the hinge pin 116. A forward stop 128 and a rear stop 130 are coupled to the ends of the spring 126. The rear stop 130 is also attached to the long portion 118 of the hinge pin 116 near the free end thereof, thus securing the spring 126 to the hinge pin 116. The spring 126 biases the hinge pin 116 to a retracted position in which the tabs 122 abut the inlet 114 of the bore 110.

The long portion 118 of the hinge pin 116 is slidable within the bore 110 so that the rear frame 24, which is coupled to the bent portion 120, is movable relative to the tray 40. As the hinge pin 116 is pulled out of the housing 102, the forward stop 128 abuts the step 112 of the bore 110 and the spring 126 is compressed. This allows the rear frame 24 to be pulled away from the tray 40, thus moving the rotating axis of the hinge assembly 100 toward the free edge 17 of the tailgate 16. The rear frame 24 can then rotate over the free edge 17 of the tailgate 16 into the loading position shown in FIG. 3. When the rear frame 24 is rotated upwards from the loading position, the spring 126 biases the hinge pin 116 to slide back into the bore 110 into a position in which the tabs 122 abut the bore inlet 114. The hinge assembly 100 with the springs provides the additional feature of acting as a shock absorber for a shifting load in the truck bed 12.

Furthermore, the moveable hinges provide for movement of the lower edge member 28 of the rear frame 24 "out of the way" below or inside the free edge 17 of the tailgate 16. This avoids the tailgate extender 22 obstructing the free edge 17 of the tailgate 16 and allows free passage of goods over the tailgate 16 in the usual manner without catching. At the same time, the hinge assembly 100 allows the tailgate 16 to pivot downwardly 270° to permit truck bed loading. An additional feature of the spring-loaded hinge assembly 100 is that the longer portion 118 may be of an extended length to permit, when the tailgate bed extender 22 is erected, extending the rear frame 24 a few inches to accommodate oversized items.

Figure 8:
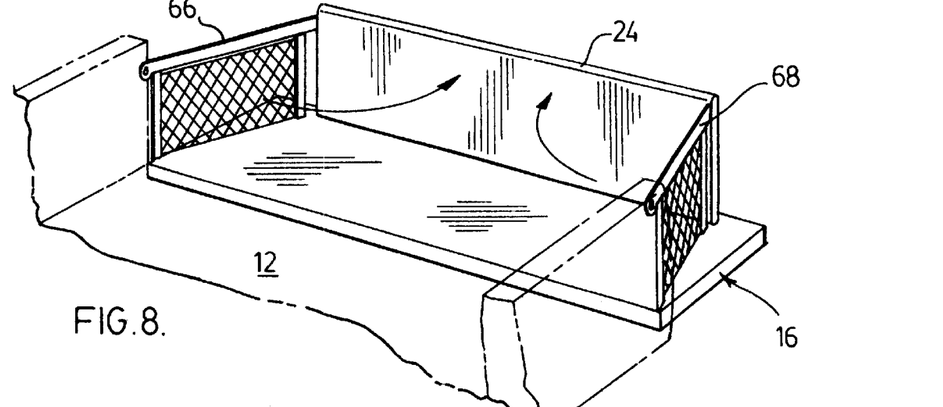
FIG. 8 is a second perspective view of the tailgate bed extender of FIG. 1 in a deployed position.
Figure 9:
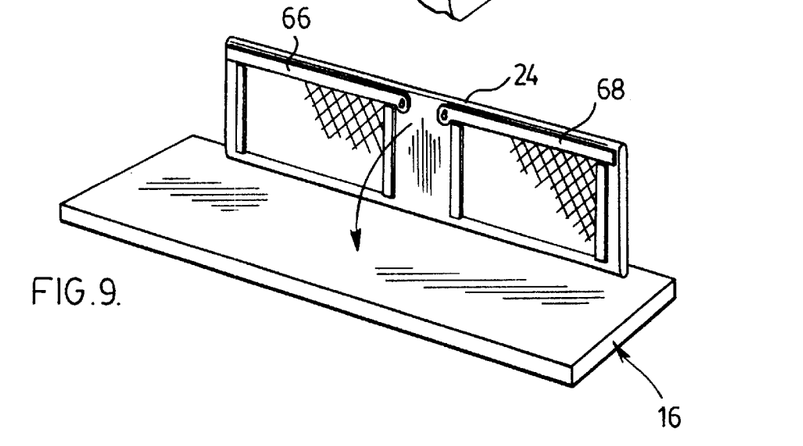
FIG. 9 is a perspective view of the tailgate bed extender of FIG. 6 in a partially deployed position.

FIGS. 8, 9 and 10 show the operation of the tailgate bed extender 22. In FIG. 8, the tailgate bed extender 22 is in the deployed position. From the deployed position, the user lifts the sidearms 66 and 68 and frees the apertures 72 from the striker posts 20 of the vehicle 10. The user then folds the sidearms 66, 68 inwardly so that they abut the rear frame 24. This is referred to as a partially deployed position and is shown in FIG. 9. From the partially deployed position, the tailgate bed extender 22 can be moved into the loading position of FIG. 3 or the stored position of FIG. 10. To move the tailgate bed extender 22 into the stored position, the rear frame 24 and sidearms 66, 68 are rotated towards the tray 40 and nested therein. The lock assembly 52 is engaged and tailgate bed extender 22 is secured in the stored position.

The tailgate bed extender 22 is fully contained on the tailgate 16 of the vehicle 10. The rear panel 38 presents a flat surface on the tailgate 16 so that the user 25 can rest boxes 27, cargo or other items on the tailgate bed extender 22. Since the extender 22 is very lightweight, there is no danger of damaging the tailgate hinges 170, shown in FIG. 10, by overloading the tailgate 16.

It will be appreciated by a person skilled in the art that the tailgate bed extender 22 described can be used with any type of vehicle 10 that has a tailgate 16. In addition, in a further embodiment, it is possible that the tailgate bed extender 22 be integrated into a tailgate 16 by an Original Equipment Manufacturer (OEM). In this embodiment, which is shown in FIG. 6, the inner wall 18 of the tailgate 16 may be recessed similar to the manner in which the tray 40 is recessed, to receive the rear frame 24. The hinge assembly 100 pivotally couples the rear frame 24 to the inner wall 18 of the tailgate 16 and the rear frame 24 nests in the recessed portions when the tailgate bed extender 22 is in the stored position. Alternatively, it is appreciated that the tailgate bed extender 22 could have the hinge assemblies 100 of the extender 22 mounted directly on the inner wall 18 of existing tailgate designs and function equally well.

Although preferred embodiments of the present invention have been described, those of skill in the art will appreciate that variations and modifications may be made without departing from the spirit and scope thereof as defined by the appended claims.

We claim:

1. A tailgate bed extender for a vehicle truck bed, said tailgate bed extender comprising:
    a tray coupled to an inner wall of a tailgate of said vehicle truck bed, said tray being inset from a free edge of said tailgate;
    a rear frame pivotally coupled to said tray;
    sidearms pivotally coupled to opposing side edges of said rear frame, said sidearms being attachable to said vehicle truck bed; and
    a hinge assembly joining said rear frame to said tray, said hinge assembly having a rotation axis, said rotation axis being movable relative to said tray;
    wherein said rear frame is rotatable from a stored position in which said rear frame abuts said tray to a loading position in which said rear frame is at an angle of at least 180 degrees relative to said tray.

2. The tailgate bed extender as claimed in claim 1, further comprising side panels coupled to said sidearms, wherein said side panels contain items located in said truck bed.

3. A tailgate bed extender as claimed in claim 1, wherein said hinge assembly further comprises a hinge pin having a first portion and a second portion, said first portion being slidable in a bore of a housing, said housing being located on said tailgate, said second portion extending at an angle to said first portion and being coupled to said rear frame, said rear frame being rotatable about said second portion, and wherein said second portion is aligned with said rotation axis.

4. A tailgate bed extender as claimed in claim 3, wherein said first portion is movable, in a direction aligned with the axis of said first portion partially out of said bore of said housing from a first position to a second position, said first portion being biased toward said first position.

5. A tailgate bed extender as claimed in claim 4, wherein said first portion is biased toward said first position by a spring located inside said housing and coupled to said first portion, said spring being compressed when said first portion is moved from said first position to said second position.

6. A tailgate bed extender as claimed in claim 3, wherein said second portion extends at an angle of approximately 90 degrees to said first portion.

7. A tailgate bed extender as claimed in claim 1, further comprising a rear panel coupled to an outer side of said rear frame, wherein said rear panel is outwardly directed from the vehicle.

8. A hinge assembly for a tailgate bed extender mounted to a vehicle tailgate, said hinge assembly comprising:
    a housing adapted to be coupled to a tray of said tailgate bed extender, said housing having a bore;
    a hinge pin having a first portion and a second portion, said first portion being at least partially inserted into said bore, said second portion being at an angle to said first portion and adapted to be pivotally coupled to a frame of said tailgate bed extender;
    a rotation axis aligned with said second portion of said hinge pin; and
    a biasing mechanism for maintaining said hinge pin at least partially inserted in said bore;
    wherein said hinge pin is at least partially removable from said housing so that said rotation axis is movable relative to the tailgate.

9. A hinge assembly for a tailgate bed extender as claimed in claim 8, wherein said second portion is at an angle of approximately 90 degrees to said first portion.

10. A hinge assembly for a tailgate bed extender as claimed in claim 9, wherein said biasing mechanism comprises a spring coupled to said first portion of said hinge pin, said spring being movable to a compressed position when said hinge pin is partially removed from said housing.

11. A tailgate bed extender for a vehicle truck bed, said tailgate bed extender mounted to a vehicle tailgate having an inner wall, said tailgate bed extender comprising:
    a rear frame pivotally coupled to said inner wall of said tailgate;
    sidearms pivotally coupled to opposing side edges of said rear frame, said sidearms being attachable to said vehicle truck bed; and
    a hinge assembly having a hinge pin joining said rear frame to a housing coupled to said inner wall of said tailgate, said hinge pin being slidable within a bore of said housing to move a rotation axis of said rear frame relative to said inner wall of said tailgate, said hinge pin being biased toward a retracted position;
    wherein said rear frame is rotatable from a stored position in which said rear frame abuts said inner wall to a loading position in which said rear frame is at an angle of at least 180 degrees relative to said inner wall.

12. The tailgate bed extender of claim 11, wherein said inner wall of said tailgate is recessed to receive said rear frame when in said stored position whereby said rear frame is nested in said recessed tailgate inner wall.

13. A hinge assembly for a tailgate bed extender, said hinge assembly comprising:
    a housing adapted to be coupled to a tailgate, said housing having a bore;
    a hinge pin having a first portion and a second portion, said first portion being at least partially inserted into said bore, said second portion being at an angle to said first portion and being pivotally coupled to a frame of said tailgate bed extender;
    a rotation axis aligned with said second portion of said hinge pin; and
    a biasing mechanism for maintaining said hinge pin at least partially inserted in said bore;
    wherein said hinge pin is at least partially removable from said housing so that said rotation axis is movable relative to said tailgate.

14. A tailgate bed extender for a vehicle truck bed, said tailgate bed extender comprising:
    a rear frame pivotally coupled to an inner wall of said tailgate;
    sidearms pivotally coupled to opposing side edges of said rear frame, said sidearms being attachable to said vehicle truck bed; and a hinge assembly joining said rear frame to said inner wall of said tailgate, a hinge pin of said hinge assembly having a first portion and a second portion, said first portion being slidable in a bore of a housing, said housing being coupled to said tailgate, said second portion extending at an angle to said first portion and being coupled to said rear frame, said rear frame being rotatable about said second portion, and wherein said second portion is aligned with a rotation axis, said rotation axis being movable relative to said inner wall of said tailgate;

wherein said rear frame is rotatable from a stored position in which said rear frame abuts said inner wall to a loading position in which said rear frame is at an angle of at least 180 degrees relative to said inner wall.

15. A tailgate bed extender for a vehicle tail bed, said tailgate bed extender comprising:

a rear frame pivotally coupled to an inner wall of said tailgate;

sidearms pivotally coupled to opposing side edges of said rear frame, said sidearms being attachable to said vehicle tail bed; and a hinge assembly joining said rear frame to said inner wall of said tailgate, said hinge assembly having a rotation axis, said rotation axis being movable relative to said inner wall of said tailgate;

wherein said rear frame is rotatable from a stored position in which said rear frame abuts said inner wall to a loading position in which said rear frame is at an angle of at least 180 degrees relative to said inner wall, said inner wall of said tailgate being recessed to receive said rear frame when in said stored position whereby said rear frame is nested in said recessed tailgate inner wall.

16. The tailgate bed extender as claimed in claim 1, wherein in said loading position, said rear frame is at an angle of 270 degrees relative to said tray.

\* \* \* \* \*